United States Patent

Huang

[11] Patent Number: 5,377,706
[45] Date of Patent: Jan. 3, 1995

[54] GARBAGE COLLECTING DEVICE

[76] Inventor: Jih-Tung Huang, No. 157, Lane 70, Sec. 3, Kang-Ning Road, Taipei, Taiwan, Prov. of China

[21] Appl. No.: 65,264

[22] Filed: May 21, 1993

[51] Int. Cl.⁶ ............................................. B08B 3/02
[52] U.S. Cl. ............................ 134/104.1; 134/166 R; 134/201; 414/327; 220/908
[58] Field of Search ............ 134/104.1, 115 G, 166 R, 134/169 R, 198, 201; 414/325, 327, 314, 328; 220/908, 87.2

[56] References Cited

U.S. PATENT DOCUMENTS

| | | | |
|---|---|---|---|
| 1,717,361 | 6/1929 | Baker et al. | 414/325 |
| 3,291,144 | 12/1966 | Diamond | 134/104.1 |
| 3,796,509 | 3/1974 | Wood | 134/104.1 X |
| 3,809,260 | 5/1974 | Zimmerman | 414/324 |
| 4,139,106 | 2/1979 | Tartar | 414/325 |
| 4,304,516 | 12/1981 | Schmidt et al. | 414/328 |
| 4,975,019 | 12/1990 | Cate et al. | 220/908 X |
| 4,986,292 | 1/1991 | Rieple | 134/166 R |
| 5,127,416 | 7/1992 | Wakabayashi et al. | 134/104.1 |
| 5,170,903 | 12/1992 | Fleming . | |
| 5,203,664 | 4/1993 | Jensen | 220/908 |
| 5,222,512 | 6/1993 | McGregor | 134/166 R |

Primary Examiner—Frankie L. Stinson
Attorney, Agent, or Firm—Browdy and Neimark

[57] ABSTRACT

Disclosed is the structure of a garbage collecting device. The present invention utilizes a tower shell body to store the garbage. Garbage can be placed on an elevator from a garbage inlet and then dumped into the tower shell body and stored therein. A rubbish container can stop beside said shell body, then dump the garbage into the rubbish container by a conveyor. A washing device is provided to flush the interior of the shell body in order to prevent odor.

5 Claims, 6 Drawing Sheets

GARBAGE COLLECTING DEVICE

FIELD OF THE INVENTION

The present invention relates to a garbage collecting device, especially to a garbage collecting device that is capable of storing garbage to prevent odors, and of dumping garbage into a rubbish container quickly.

BACKGROUND OF THE INVENTION

Garbage collection is becoming a difficult problem when public sanitation is valued. In the present, garbage is usually collected by storing garbage in garbage cans, then carrying garbage away by rubbish containers. But garbage cans is usually large and their openings is upward, therefore the openings are too high for children and old people. There are frequently too much garbage to be stored, some garbage will drop around the garbage can, and cats will gather around. Dogs and cats pick up foods from garbage bags, and pollute all around.

There is another defect of the traditional garbage collecting method. Due to the limit of dimensions of the garbage can, one garbage can is usually not large enough to store the total amount of garbage. Therefore, several cans are needed. As a result, the garbage cans take too much space of streets, and destroy the sight.

There is still another defect of the traditional garbage collecting method. One rubbish container needs about five to six operators to dump garbage from garbage cans into the container. But few people are willing to do such a work. And, the dumping or collecting process pollutes the streets and makes odors.

SUMMARY OF THE INVENTION

It is therefore an object of this invention to provide a garbage collecting device, which is capable of storing garbage and dumping the garbage in rubbish containers easily and quickly without polluting the streets.

Another object of the present invention is to provide a garbage collecting device which is capable of being operated by oneself.

This object of the present invention are fulfilled by providing a garbage collecting device for collecting garbage, comprising: a vertically extended shell body, having opposite walls and a top and a bottom, said top including an exhaust exit, one of said walls having a garbage exit and a garbage exit door covering said garbage exit, the other one of said walls having a garbage inlet and a garbage inlet door covering said garbage inlet door, said bottom having fixing legs; a circular elevator, having two chains and a plurality of garbage carriers, each chain forming an equivalent reversed "L" shaped circular trajectory, each garbage carrier having two hinges attached to said two chains and a plate rotatably connected to said two hinges at its two ends whereby said plate is capable of being lifted in a horizontal gesture and lowered in a vertical gesture, each garbage carrier being equally spaced apart; an elevator driving means, for driving said chains and said garbage carriers to circulate alone said reversed "L" shaped circular trajectory; a reversed "L" shaped partition plate, provided between said chains within said elevator, for guiding said garbage carriers uprightly and dumping garbage inside said shell body; an "L" shaped partition plate, provided beside said chains, for guiding said chains and said garbage carriers downward, and associating with said walls of said shell body in order to form a garbage storing space inside said shell body, the bottom of said "L" shaped partition plate being inclined to form a drainage; and a conveyer, provided at the bottom of said garbage storing space, for conveying the garbage inside said garbage storing space toward said garbage outlet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2-A shows the perspective view of a garbage carrier;

FIG. 2-B shows the side view of a plate and a hinge;

DETAILED DESCRIPTION OF THE EMBODIMENTS

Figure 1:
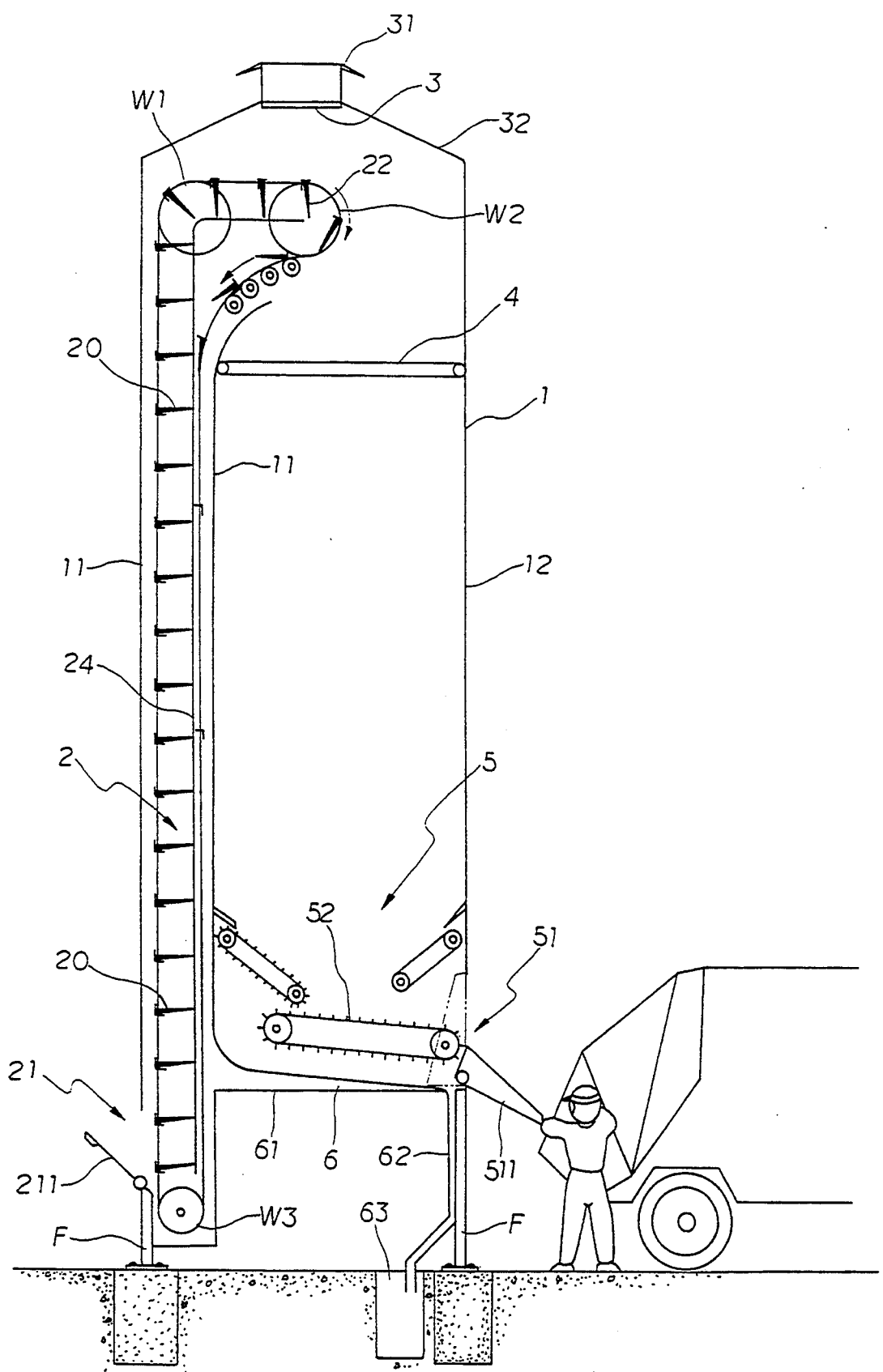
FIG. 1 shows the schematic diagram of the side view of the present invention.

The preferred embodiment of the present invention is shown in FIG. 1. The main structure of the embodiment is a vertically extended shell body 1 which is constructed by opposite walls 11, 12 and a top 32 and a bottom 61. The shell body 1 has several fixing legs F provided on the bottom 61 for installation on the ground beside a street. The top 32 has an exhaust exit 3, where odors can be released. A cover 31 is provided on the exhaust exit 3 to prevent rains from dropping in. A garbage inlet 21 is provided on one of the walls 12. A garbage outlet 51 is provided on one of the walls 12 opposite to the garbage inlet 21.

A washing device 4 is provided within the shell body 1, nearby the top 32. Washing device 4 can flush the interior of the shell body 1, in order to prevent the breeding of microbe thereon.

A conveyer 5 is provided within the shell body nearby the bottom 61, for dumping the garbage stored therein out into a rubbish container.

An elevator 2 is provided within the shell body beside one of the walls 72. The elevator 2 is driven to circulate step by step. The driving power of the elevator 2 may be come from the power of street lamps. One can put garbage into the elevator 2, then the elevator 2 will convey and dump the garbage into the shell body 1 for storing. When the shell body 1 is full of garbage, an operator can drive a rubbish container beside the shell body, open a garbage outlet 51, start the conveyer 5, then the garbage stored in the shell body 1 will be dumped into the rubbish container as shown in FIG. 1. In the mean time, washing device 4 will flush the interior walls. Therefore, the garbage can be collected by the rubbish container quickly and easily. The cleaning of the garbage container is done at the same time.

Figure 2:
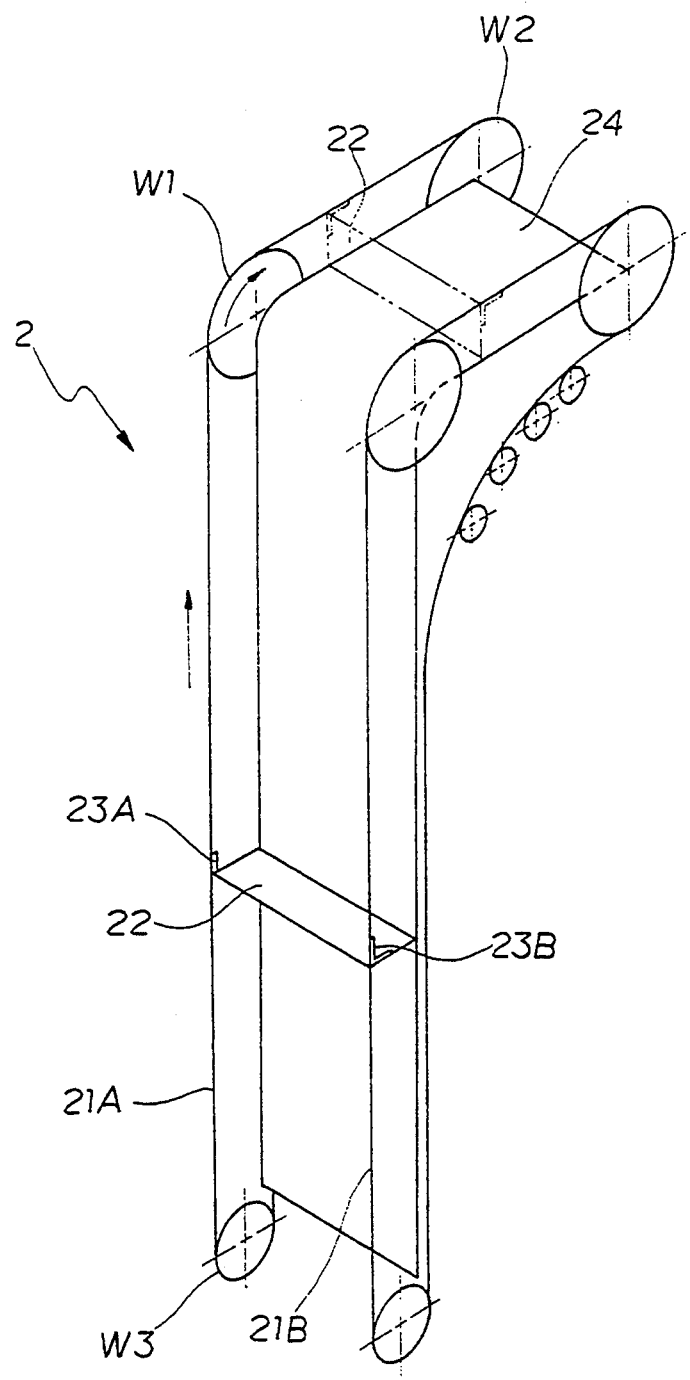
FIG. 2 shows the schematic diagram of the perspective view of an elevator.
Figure 2A:
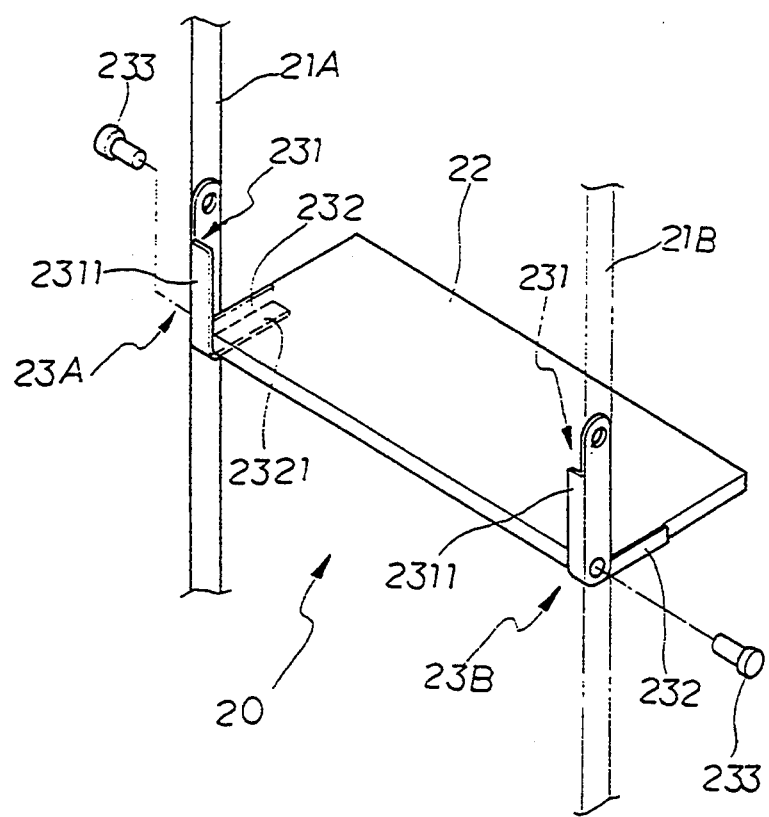
Figure 2B:
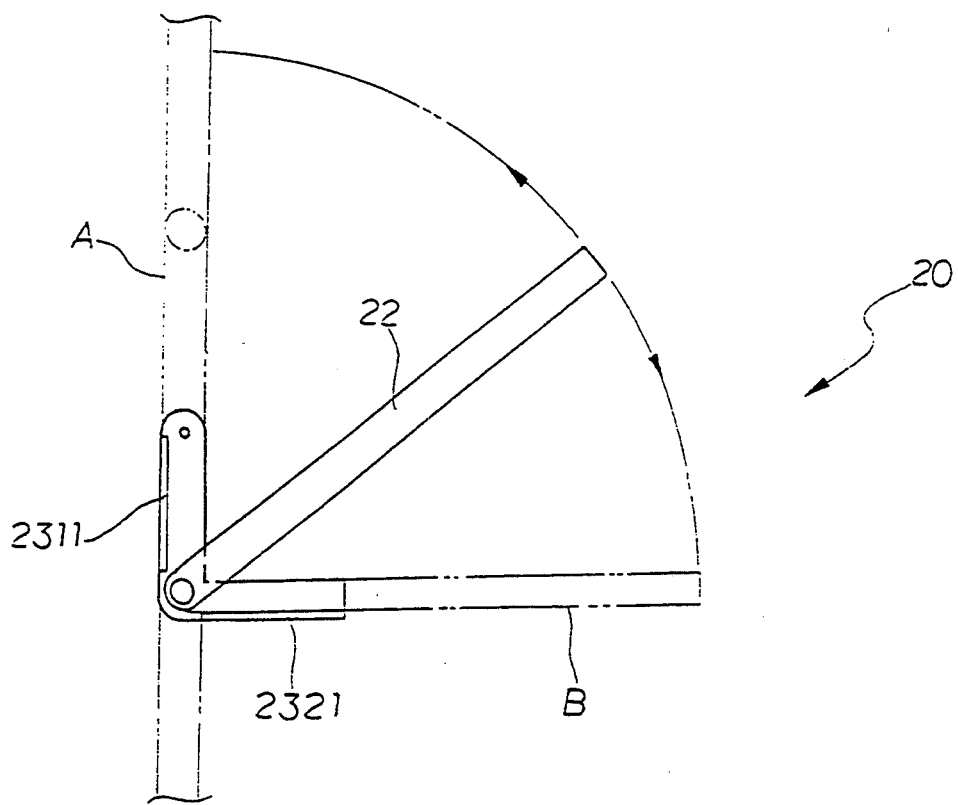

The details of the embodiment will be described hereinafter. The elevator 2, as shown in FIG. 2, has two chains 21A and 21B. Chains 21A and 21B are allocated as reversed "L" shaped trajectories in parallel. Two driving wheels W1 are provided at the top of the trajectories to drive the chains 21A and 21B. The driving wheels W1 can be driven by motors or other driving means. Two dumping wheels W2 are provided at the center of the shell body 1 near the top 32, for guiding the chains 21A and 21B to go through and to dump the garbage which is lifted by elevator 2 into the shell body 1. Two idle wheels W3 are provided at the bottom of the trajectories to guide the chains 21A and 21B. Each pair of wheels is concentric but no shaft is provided between the wheels. Two chains 21A and 21B are driven at the same velocity.

FIGS. 2-A and 2-B shows a garbage carrier 20 provided on the chains. Garbage carriers 20 are mounted on chains 21A and 21B, and equally spaced apart. Each garbage carrier 20 includes a plate 22 and two hinges 23A and 23B. Hinges 23A and 23B are "L" shaped. The vertical portion 2311 of the hinges and is hinged on chains 21A and 21B via four bolts 233. The horizontal portion 232 of the hinges is toward the interior of the trajectories of the chains. The plate 22 are hinged on the hinges 23A and 23B by bolts at the same time, so that the plate 22 can flap between a vertical gesture A and a horizontal gesture B as shown in FIG. 2-2. The plate 22 is limited by tabs 2311 and 2321. When the plate 22 is lifted, it is in the horizontal gesture B in order to move the garbage. When the plate 22 is lowered, it is in a vertical gesture in order to save the space.

Please refer to FIG. 2. A reversed "L" shaped partition plate 24 is provided inside the trajectories of the chains 21A and 21B. Therefore, partition plate 24 and one of the walls 12 of the shell body 1 form a channel therebetween (shown in FIG. 1). When the plate 22 rises in the channel, garbage is urged uprightly. After the plate 22 passes through the driving wheel W1, the plate 22 and the garbage is urged horizontally. After passing through the end of the partition plate 24, garbage is dumped into the shell body 1. Then the plate 22 is guided back to the lower end of the trajectory. Another partition plate 11, which is "L" shaped, is provided beside the partition plate 24. The partition plates 24 and 11 form a slot where the chains 21A and 21B and the garbage carriers 20 can pass through. The lower portion of the partition plate 11 is slanted to form a drainage 6. A drainpipe 62 communicates the drainage 6 and a cloaca 63. The waste water flushed from the washing device 4 will collected by the drainage 6 and then go into the cloaca 63.

For the reason of safety, a door 211 is provided to cover the garbage inlet 21. When the door 211 is opened, the driving wheels W1 should not be driven to prevent injury. After garbage is placed on the carrier 20, and the door 211 is closed, the driving wheels W1 begin lifting the garbage. It should be noted that such a function is not difficult to achieve in the present art. Usually, a limit switch or other sensors is utilized to sense the position of the door in order to control the driving wheels W1.

A door 511 is provided to cover the garbage outlet 51. Door 511 is funnel-like. When garbage is dumped out, door 511 is opened and acts as a funnel to guide the garbage into the rubbish container.

Figure 3:
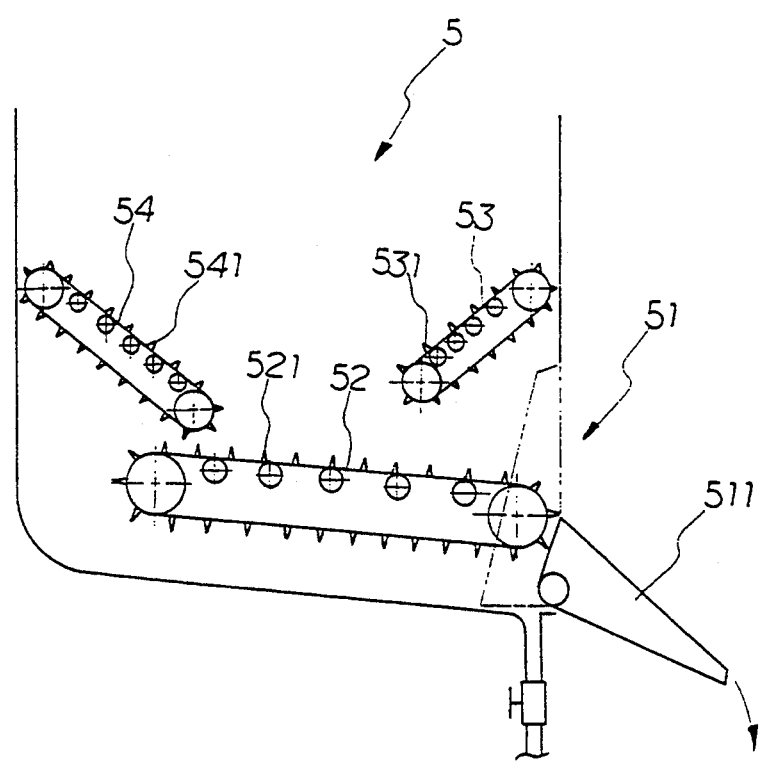
FIG. 3 shows the schematic diagram of the side view of a conveyor.

Please refer to FIG. 3. The conveyor 5 includes conveying belts 52, 53, and 54. The conveying belts 53 and 54 are inclined for urging garbage downward onto the conveying belt 52. The conveying belt 52 is horizontally disposed to urge the garbage outward and dump it out. Then the garbage is guided by door 511 into the rubbish container.

Figure 4:
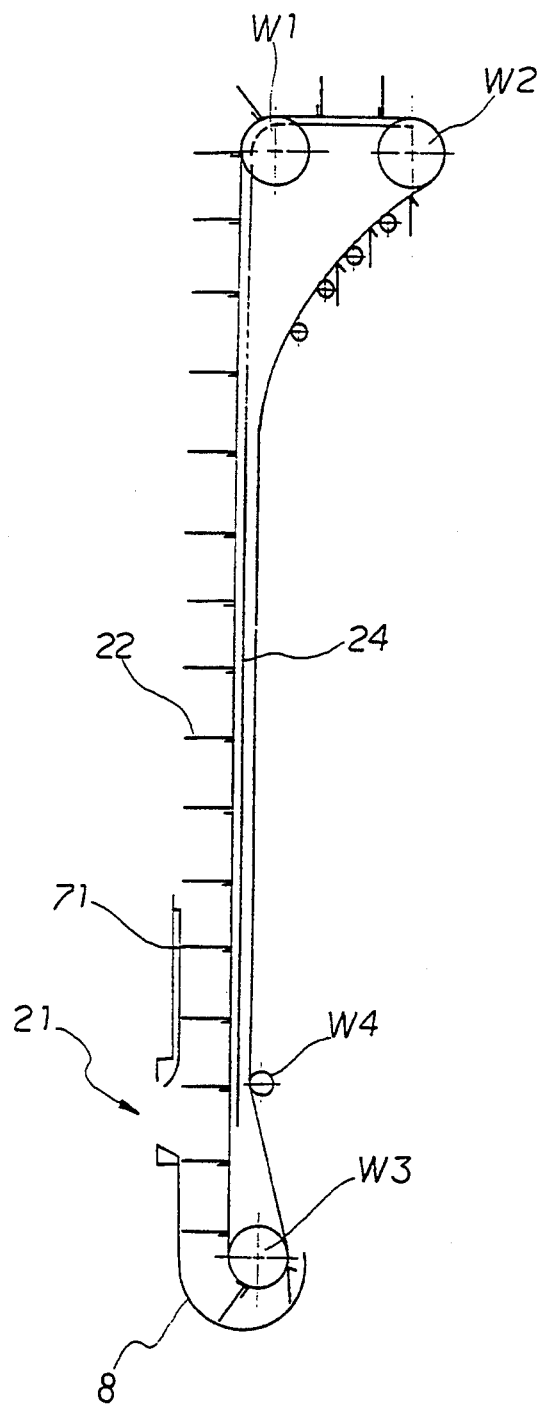
FIG. 4 shows the schematic diagram of the side view of another embodiment of the elevator.

Also a preferred embodiment is illustrated hereinbefore, there may be modifications from that embodiment. For instance, FIG. 4 shows another structure of the elevator 2. In this embodiment, the plates 22 of the garbage carriers 20 direct outward. Another two idle wheels W4 is provided to guide the chains. A "U" shaped guider 8 and a inlet guider 71 are provided to guide the plates 22 and the garbage.

While the invention has been described by way of example and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A garbage collecting device for collecting garbage, comprising:

a vertically extended shell body, having opposite walls and a top and a bottom, said top including an exhaust exit, one of said walls having a garbage exit and a garbage exit door covering said garbage exit, the other one of said walls having a garbage inlet and a garbage inlet door covering said garbage inlet door, said bottom having fixing legs;

a circular elevator, having two chains and a plurality of garbage carriers, each chain forming an equivalent reversed "L" shaped circular trajectory, each garbage carrier having two hinges attached to said two chains and a plate rotatably connected to said two hinges at its two ends whereby said plate is capable of being lifted in a horizontal gesture and lowered in a vertical gesture, each garbage carrier being equally spaced apart;

an elevator driving means, for driving said chains and said garbage carriers to circulate alone said reversed "L" shaped circular trajectory;

a reversed "L" shaped partition plate, provided between said chains within said elevator, for guiding said garbage carriers uprightly and dumping garbage inside said shell body;

an "L" shaped partition plate, provided beside said chains, for guiding said chains and said garbage carriers downward, and associating with said walls of said shell body in order to form a garbage storing space inside said shell body, the bottom of said "L" shaped partition plate being inclined to form a drainage; and a conveyer, provided at the bottom of said garbage storing space, for conveying the garbage inside said garbage storing space toward said garbage outlet.

2. A garbage collecting device for collecting garbage as claimed in claim 1, wherein:

said conveyer includes two downward conveyers and a horizontal conveyer, said two downward conveyers are inclined toward said horizontal conveyer in order to force the garbage to drop on said horizontal conveyer.

3. A garbage collecting device for collecting garbage as claimed in claim 1, wherein: said elevator driving means automatically stops when said garbage inlet door is not closed.

4. A garbage collecting device for collecting garbage as claimed in claim 1, wherein: said garbage exit door is funnel-like.

5. A garbage collecting device for collecting garbage as claimed in claim 1, further comprising:
a washing device provided within said shell body, for showering said garbage storing space.

* * * * *